United States Patent [19]

Gegenheimer et al.

[11] Patent Number: 5,180,153

[45] Date of Patent: Jan. 19, 1993

[54] METHOD AND APPARATUS FOR MAINTAINING CONFIDENTIAL PRINTED-SHEET OUTPUT

[75] Inventors: Harold W. Gegenheimer, 2 Eldredge St., Mystic, Conn. 06355; Webster C. Roberts, Noank, Conn.

[73] Assignee: Harold W. Gegenheimer, Mystic, Conn.

[21] Appl. No.: 788,876

[22] Filed: Nov. 7, 1991

Related U.S. Application Data

[63] Continuation-in-part of Ser. No. 665,171, Mar. 7, 1991, abandoned.

[51] Int. Cl.⁵ ............................................. B42B 1/02
[52] U.S. Cl. ...................................... 270/53; 270/52
[58] Field of Search ........................ 270/52, 53, 58, 59, 270/37

[56] References Cited

U.S. PATENT DOCUMENTS

| | | |
|---|---|---|
| 3,152,800 | 10/1964 | Hanson . |
| 3,954,543 | 5/1976 | Messmer . |
| 4,009,071 | 2/1977 | Snellman et al. . |
| 4,134,672 | 1/1979 | Burlew et al. . |
| 4,473,425 | 9/1984 | Baughman et al. . |
| 4,701,233 | 10/1987 | Beck et al. . |
| 4,816,108 | 3/1989 | Beck et al. . |
| 4,861,212 | 8/1989 | Cordia . |
| 4,993,697 | 2/1991 | Yamashita ............................ 270/53 |

FOREIGN PATENT DOCUMENTS

| | | |
|---|---|---|
| 55-21611 | 2/1980 | Japan . |
| 55-45219 | 3/1980 | Japan . |
| 57-57090 | 4/1982 | Japan . |
| 59-13471 | 1/1984 | Japan . |
| 269852 | 11/1987 | Japan .................................. 270/53 |
| 6346876 | 2/1988 | Japan . |
| 127977 | 5/1988 | Japan .................................. 270/53 |
| 63-250279 | 10/1988 | Japan . |
| 63-294075 | 11/1988 | Japan . |
| 1-120964 | 5/1989 | Japan . |
| 1-248875 | 10/1989 | Japan . |
| 1-256279 | 10/1989 | Japan . |
| 1-264363 | 10/1989 | Japan . |

OTHER PUBLICATIONS

Product brochure printed by RENA systems, Inc. "RENA TL-100", 1991.

Primary Examiner—Edward K. Look
Assistant Examiner—Therese M. Newholm
Attorney, Agent, or Firm—Morgan & Finnegan

[57] ABSTRACT

An apparatus and method to provide confidentiality for the message content in copy received from an electrographic device is disclosed. Confidentiality is communicated to the apparatus by utilizing a confidentiality code mark on the first and last sheets of a set of copy for which privacy is desired. The confidentiality or non-confidentiality of the copy may also be communicated by using a last sheet of copy containing predetermined code marks. In one embodiment, the apparatus receives sheets of copy output from the elctrographic device and directs sheets of copy that are not confidential in nature into one output tray for removal. The apparatus directs sheets of copy that are confidential in nature into an assembly station for binding. After the last sheet of the confidential document is delivered to the assembly station, the bundle of copy sheets is advanced into a storage tray. The sides of the bundle of copy sheets are bound during its travel. In an alternative embodiment, all sheets of copy are directed to the assembly station. The bundle of sheets are bound according to their confidential or non-confidential nature which is communicated through the use of specifically coded cover sheets. Accordingly, confidentiality of the message content of any document is provided by the method of utilizing cover sheets of the document that contain a confidentiality code mark, but do not contain any sensitive information, and by having the sides of the reproduced document bound along its edges.

32 Claims, 12 Drawing Sheets

FIG.8

SEND TO:
NUMBER OF PAGES:

FOR:

DATE:

```
CFXCFXCFXCFXCFXCFXCFXCFXCFXCFXCFXCFXCFXCFX
CFXCFXCFXCFXCFXCFXCFXCFXCFXCFXCFXCFXCFXCFX
...
```

"END OF CONFIDENTIALITY" CODE MARK

FIG. 9

METHOD AND APPARATUS FOR MAINTAINING CONFIDENTIAL PRINTED-SHEET OUTPUT

CROSS-REFERENCE TO RELATED APPLICATION

This application is a continuation-in-part of our co-pending application, Ser. No. 07/665,171 filed on Mar. 7, 1991, and which is incorporated herein by reference.

BACKGROUND OF THE INVENTION

This invention relates to an apparatus and method of securely providing confidentiality and privacy for the contents of a document that is reproduced by an electrographic machine, such as a copier/duplicator machine, or delivered via electrical transmission by a device such as a facsimile, or teleprinter machine.

Facsimile machines in particular, operate by receiving facsimile information which is reproduced onto paper that is then transported into a storage tray for retrieval. A conventional type facsimile machine does not distinguish between confidential and non-confidential transmission and cannot securely transmit a confidential document. In particular, the output paper is not protected from view, and therefore the contents may be exposed to any third party before it reaches the intended recipient, potentially destroying the confidentiality of the contents. The problem is more acute when documents that require confidentiality from third parties are transmitted during off business hours, such as documents sent from overseas locations, or when documents are transmitted to unattended machines at any time. If the intended recipient is not present there can be no guarantee that the contents of a confidential document will not be disclosed to a third party.

Devices for preventing the exposure of a written message on a sheet of paper are generally known in the art. For example, U.S. Pat. No. 3,152,800, issued to Hanson and entitled HANDLING A COMBINATION LETTER-ENVELOPE, discloses an invention for providing a combination letter-envelope which is adapted for sealing, to prevent exposure of a message written thereon.

Similarly, METHOD FOR FOLDING AND SEALING SHEETS, U.S. Pat. No. 4,701,233, issued in the name of Beck et. al., discloses a method for making a plurality of folds, and sealing along the edges thereof, thereby concealing portions of the front side of a sheet and enhancing the security of its written contents.

Moreover, Japanese Patent No. 63-46876, issued on Aug. 14, 1986, describes a facsimile machine that attaches, from an additional internal roll of paper, a cover sheet over the face of a sheet whose contents are desired to be kept confidential.

Also related to the field of enclosing copy, a device for binding together copies for a set of documents produced on a copier/duplicator was disclosed in U.S. Pat. No. 4,134,672, entitled COPIER FINISHER FOR AN ELECTROGRAPHIC REPRODUCING DEVICE, and issued to Burlew, et. al. This device produces stapled booklets from a set of document sheets. The sheets are fed to a copier finisher which inverts the sheets and delivers them to a finishing tray. A set of sheets received by the tray are jogged to align adjacent sheets, and then one or more staples are applied to form a stapled booklet. The finished booklet is removed from the assembly tray and transported to a tote tray for removal by an operator.

Although providing a way for obscuring the contents of copy, the devices discussed above present a number of significant drawbacks. The devices either (1) secure sheets together in only one area of one side of the document and thus do not ensure adequate privacy; or (2) require the folding, sealing and additional paper handling of the individual sheets themselves to achieve any form of confidentiality of the document's text. Furthermore, none of the previously discussed devices has the ability to distinguish between confidential and non-confidential documents, so that only confidential documents are maintained private.

There is, thus, a need for a system which can distinguish between confidential and non-confidential documents and which can insure the privacy of such confidential documents whether in the form of a single sheet or a plurality of sheets.

Accordingly, it is an object of the present invention to provide a novel apparatus and method for enhancing the security and/or confidentiality of a document that is reproduced from an electrographic transmission/reproduction machine.

It is another object of the present invention to provide an apparatus and method for detecting and separating the non-confidential and confidential paper output of an electrographic transmission/reproduction machine, in such a way that the confidential documents will remain confidential.

A more specific object of the present invention is to provide an apparatus and method for separating confidential and non-confidential documents delivered from a conventional facsimile machine, and for binding the confidential document sheets to provide privacy for the information contained therein.

A further object of the present invention is to provide an apparatus and method for separating confidential and non-confidential documents delivered from a conventional electrographic transmission/reproduction machine, and for binding the non-confidential documents to provide a more convenient handling of such documents.

It is still another object of the present invention to provide an apparatus for assembling into a booklet, copies constituting a set of documents produced by an electronic reproduction device It is a further object of the present invention to accomplish the above stated objects by utilizing an apparatus which is simple in design and use, and economical to manufacture.

The foregoing objects and advantages of the invention are illustrative of those which can be achieved by the present invention and are not intended to be exhaustive or limiting of the possible advantages which can be realized. Thus, these and other objects and advantages of the invention will be apparent from the description herein or can be learned from practicing the invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

In accordance with these and other objects of th present invention, a brief summary of an exemplary embodiment is presented. Some simplifications and omissions may be made in the following summary, which is intended to highlight and introduce some aspects of the present invention, but not to limit its scope. Detailed descriptions of exemplary embodiments adequate to allow those of ordinary skill in the art to make and use the inventive concepts will be provided later.

In general, according to one aspect of the invention, an apparatus and method are provided to secure confidentiality for the message content in copy received from an electrographic device, such as a facsimile machine terminal.

More specifically, the invention in its broader aspects contemplates use of an indicia on a reproduced or transmitted sheet to distinguish confidential and non-confidential sheets. Upon receipt of the reproduced or transmitted sheets, the confidential and non-confidential sheets will be capable of being segregated for the purpose of maintaining the privacy of such confidential sheets and subjecting such sheets to a subsequent treatment to further insure such confidentiality.

In one embodiment according to the invention, the system receives sheets of copy output from an electrographic device and directs sheets of copy that are not confidential, i.e., sheets which are not preceded by a copy sheet containing a "start of confidentiality" code into one output tray for removal. A sheet which is detected as confidential or perceivably as a sheet containing a "start of confidentiality" code triggers a confidentiality mode in the invention, and causes that sheet and all sheets subsequent to be directed into an assembly station or tray. Sheets are directed into the assembly tray, forming a bundle, until a sheet containing an "end of confidentiality" code is detected and delivered into the assembly tray.

Where desired, the apparatus then advances the bundle from the assembly tray into a storage tray. As the bundle is delivered to the storage tray, the movement of the bundle is intermittently stopped, thereby allowing the opposite sides of the advancing bundle to be bound at that instant.

Accordingly, confidentiality of the message content of any document may be provided by the method of utilizing, as a top and bottom cover of the document, sheets of copy that do not contain any sensitive information, but rather contain a confidentiality code for activating and deactivating the confidential mode of the invention. The method includes the steps of separating the non-confidential from th confidential documents, and thereafter having both sides of the reproduced or transmitted confidential document bound along its edges to further secure privacy of the message contained therein, from those other than the proper recipient.

In an alternative embodiment, all sheets of copy are delivered to an assembly station or tray for bundling. Confidentiality of the message may be provided by utilizing, as a top and bottom cover of the document, sheets of copy that do not contain any sensitive information, but rather contain a confidentiality code for activating and deactivating the confidential mode of the invention. Confidentiality may also be provided using a last sheet containing a predetermined code and no confidential information to effect the activation of the confidential mode. A confidential message may thereafter be bound on all sides of the bundle as it is delivered to the storage tray.

This alternative embodiment also provides for the assembling and binding of a non-confidential message by utilizing no indicia on the first sheet of copy and a predetermined code on the last sheet of copy for setting the non-confidential mode. A recognized indicia for effecting the delivery and binding of a non-confidential message on less than all four sides of the bundle is provided.

Preferably, sheets having perforated edges for easy separation from the bound document are used with the invention so that the proper recipient will not be inconvenienced by the binding of the document.

BRIEF DESCRIPTION OF THE DRAWINGS

The invention will be further described by wa of reference to the following drawings, in which:

FIG. 8 is an example of a confidential bottom coversheet.

FIG. 9 is an example of a confidential top coversheet.

DETAILED DESCRIPTION OF THE INVENTION

General Description

It is to be understood that the present invention may be used with equal facility and advantage with various electronic reproducing/printing or electrographic machines, and that the following description of a facsimile machine, related to but not forming part of the invention, is provided for illustrative purposes only.

Figure 1:
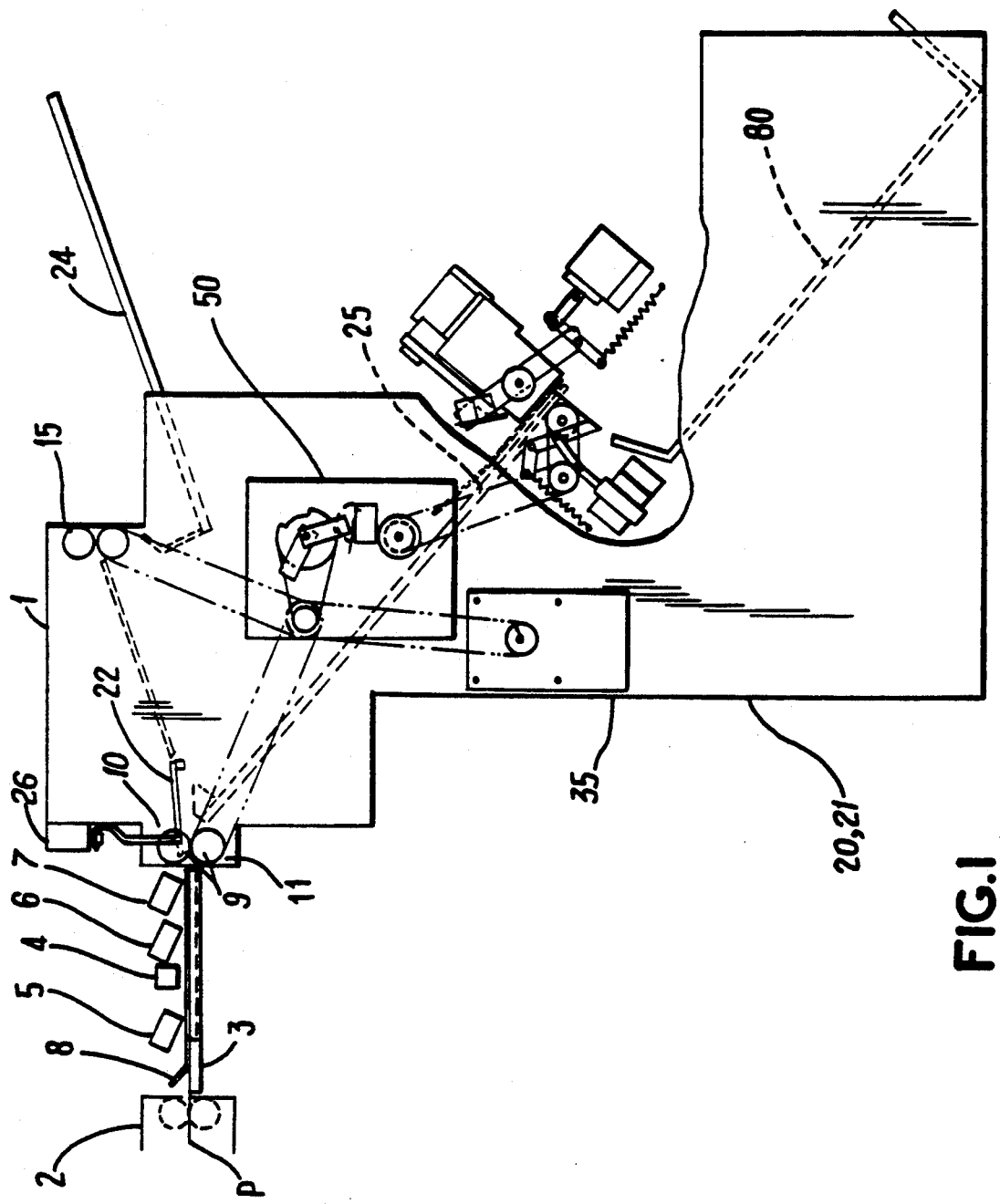
FIG. 1 is a diagram of the partially cut away cross-sectional view of the apparatus for maintaining confidential the printed-sheet output of an electrographic machine.

Referring now to the drawings, wherein like numerals refer to like components, there is disclosed in FIG. 1 a diagram related to the general arrangement of the components comprising one embodiment of an apparatus for maintaining the confidentiality of printed-sheet output (referred to as "CFX"), according to the invention.

Figure 12:
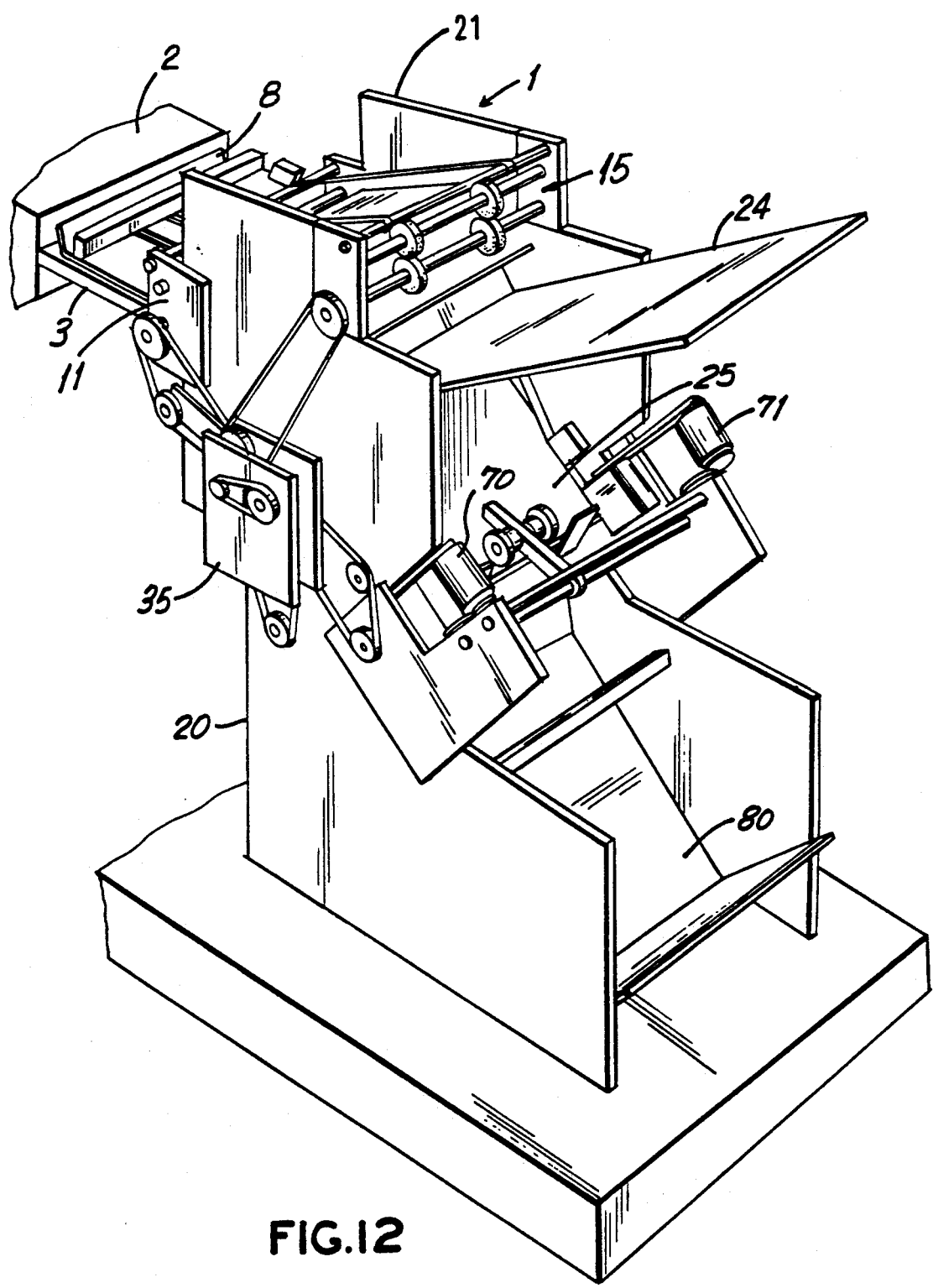
FIG. 12 is an isometric view of one embodiment of the apparatus for maintaining confidential the printed-sheet output of a electrographic machine.

FIG. 12 is a perspective view also embodying the general arrangement of the invention. However, reference to this Figure will be limited.

Referring to FIG. 1, an electrographic reproducing device such as a conventional facsimile machine, designated by reference numeral 2, is capable of producing a stream of sheets of paper which are fed into the CFX 1.

The CFX 1 includes, a receiving paper tray 3 whereby a sheet of paper P, being transported by sets of output rollers of an adjacent facsimile machine 2, is driven across a path comprising such receiving paper tray 3. Receiving paper tray 3 contains a plurality of microswitches 5, 6, and 7 thereon, for detecting the presence and position of the leading edge of advancing sheet P. Receiving paper tray 3 further includes a photo-optic sensor 4 or the like for detecting whether sheets P, of the document being advanced across receiving paper tray 3, is of a confidential or non-confidential nature.

After passing through the receiving paper tray 3, sheet P then moves into the nip between a set of idler rollers 10 and a set of drive rollers 11 that comprise an input roller assembly 9, located at the proximal end of the receiving paper tray 3. The lower set of drive rollers 11 are rotatably secured to a shaft 12 (shown in detail in FIGS. 3 and 4) supported by bearings on each end (not shown, for clarity) and attached to side frames 20 and 21 (shown in detail in FIG. 2) of CFX 1.

The upper set of idler rollers 10 is rotatably secured to a shaft 13 (shown in detail in FIGS. 3 and 4) which is also attached by its ends to the side frames 20 and 21 of CFX 1. All rollers are advantageously covered or made of a resilient substance, such as foam, rubber, or the like, that can engage and drive a sheet of paper without damaging the sheet.

Figure 3:
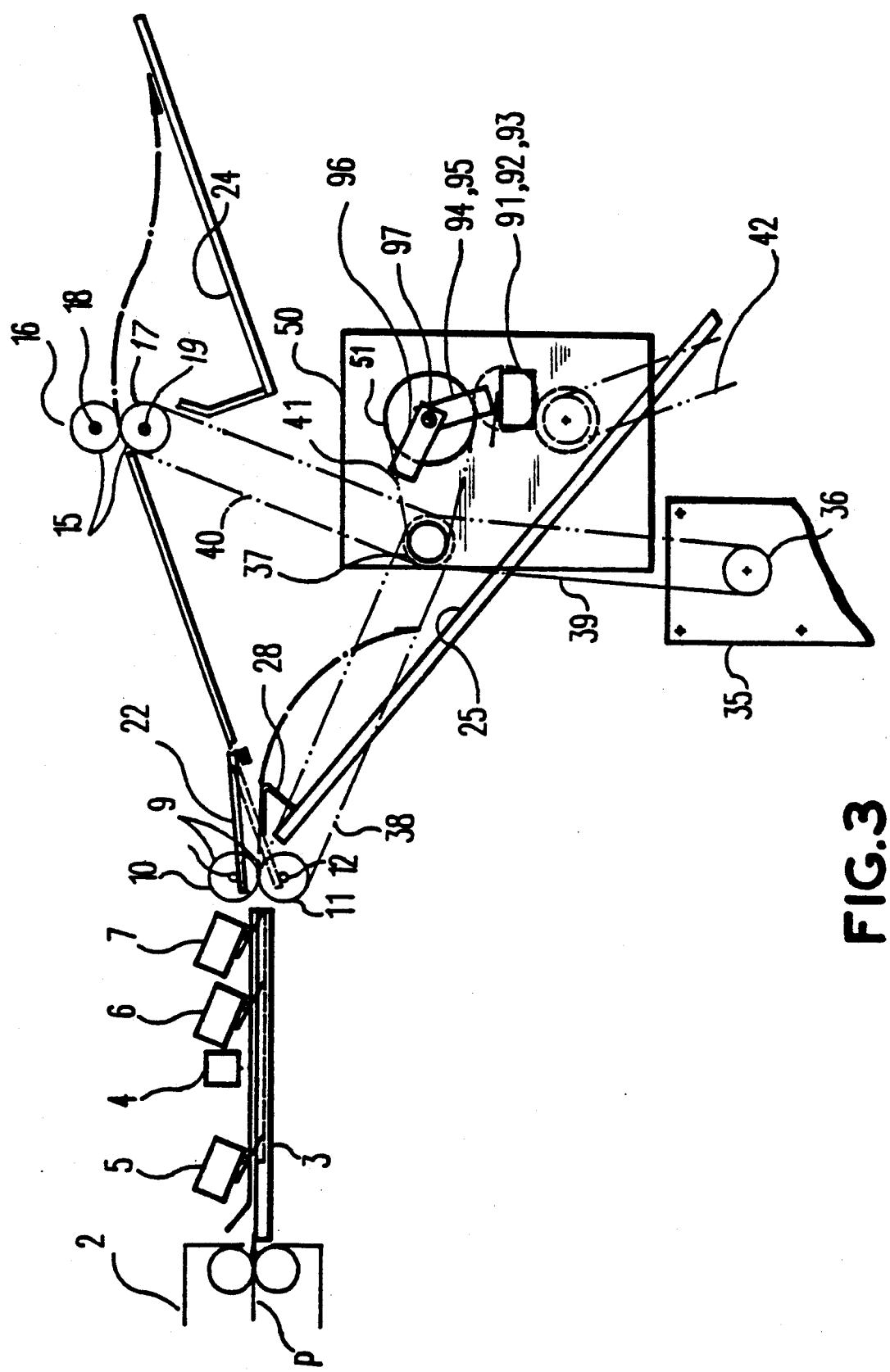
FIG. 3 is a diagram of an enlarged fragmentary cross-section of the upper portion of the apparatus.

Referring now to both FIGS. 1 and 3, CFX 1 is also provided with a diverter gate 22 located after input roller assembly 9 in the paper path, such diverter gate 22 being pivotally attached on its ends and movable between two positions.

In one mode, the non-confidential mode, for example, the diverter gate 22 in FIG. 3 may be positioned such that sheet P is delivered through input roller assembly 15. Such output roller assembly 15 preferably comprises a set of upper idler rollers 16 rotatably secured to a shaft 18 (attached to side frames 20 and 21), and a set of lower drive rollers 17, also rotatably secured to a shaft 19. Shaft 19 is supported by bearings (not shown, for clarity) on each end and attached to side frames 20 and 21 of CFX 1, for appropriate rotating motion. Output roller assembly 15 delivers sheets P seriatim into an upper exit tray 24, where the sheets may then be removed by an operator.

In another mode, the confidential mode, for example, diverter gate 22 is positioned such that after sheet P moves through input roller assembly 9, it is deflected along a lower paper path, as shown in FIG. 3. Input roller assembly 9 drives sheet P into an assembly tray 25, which may be angled so that sheet P will be moved by its own weight.

Figure 7:
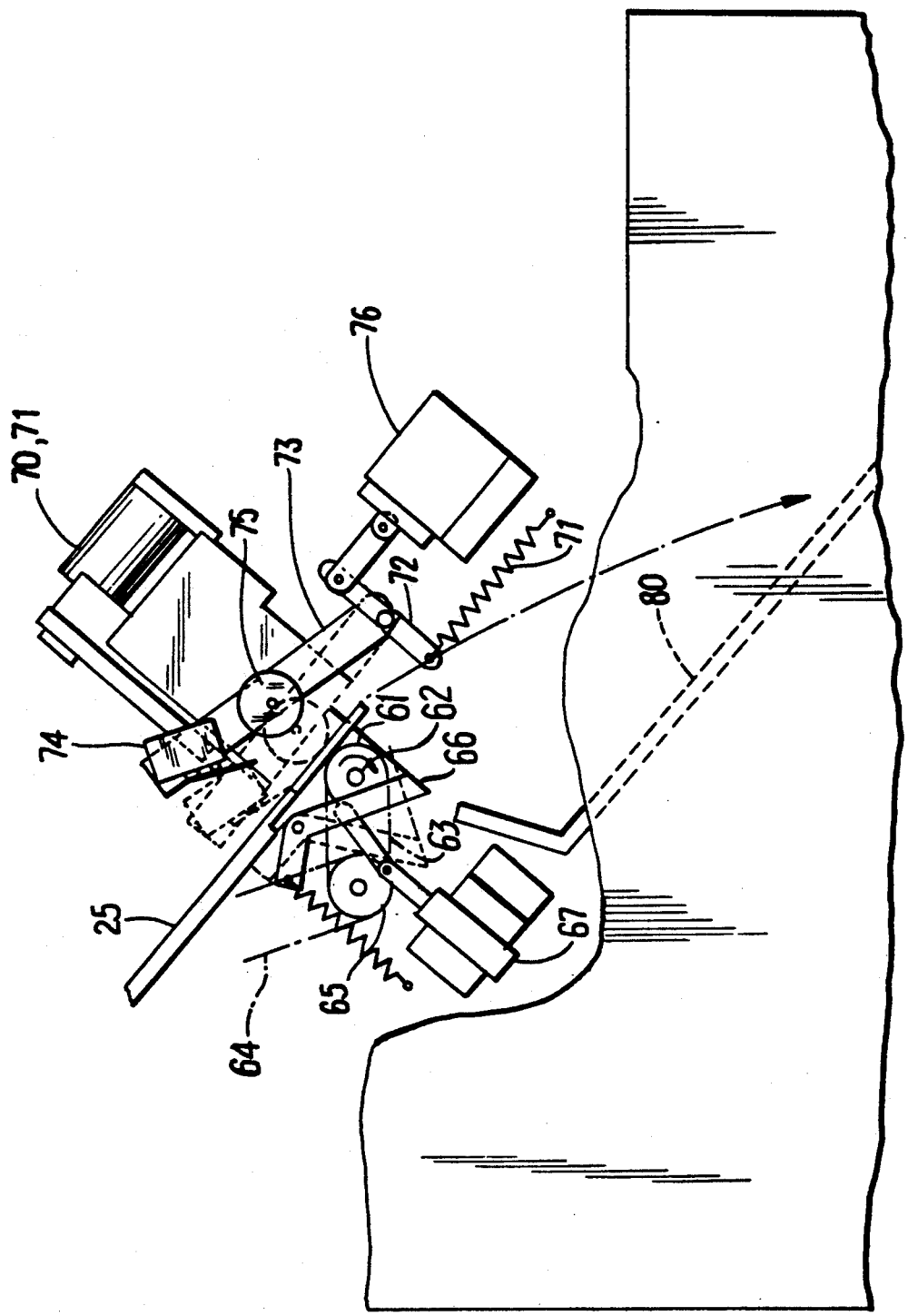
FIG. 7 is a diagram of a fragmentary cross-section, partially cut away and with some parts omitted for clarity, of the lower portion of the assembly tray, illustrating the different positions of the holding gate and pinch roller assembly.

Assembly tray 25 may also include guides (not shown, for clarity) along its sides so as to deflect sheet P entering assembly tray 25 downward. Referring now to FIG. 7, sheet P travels across assembly tray 25 and passes over a lower drive roller 61 at the lower end of assembly tray 25 and through the throats of a pair of staplers 70 and 71 that are mounted on each side of the lower end of assembly tray 25, until it (sheet P) engages a holding gate 66.

Document sheets P are continuously fed seriatim into assembly tray 25 and are stacked in a collating manner. Once the top cover sheet P is received into assembly tray 25, lower holding gate 66 opens and a pinch roller 75 is brought into driving engagement with the upper surface of sheets P resting over drive roller 61, thereby advancing the collated stack of sheets P from assembly tray 25 into a storage tray 80.

Advantageously, the collated stack or bundle of sheets P is driven from assembly tray 25 into storage tray so, passing through the throat of the staplers 70 and 71 which intermittently staple the collated sheets P together along both sides of the stack during its downstream travel into lower storage tray 80. The completed set of secured confidential papers is thereby discharged into lower storage tray 80 and stacked with other sets of secured confidential papers, for subsequent removal by an operator.

DETAILED DESCRIPTION OF THE DRAWINGS

In operation, CFX 1 is capable of functioning in two modes, specifically, a confidential mode and a non-confidential mode. Confidentially, when required, is achieved by transmitting first and last sheets P of a document, in which such first and last sheets P contain an information code or mark to effect necessary apparatus modes. These sheets P, shown in FIGS. 8 and 9, form the outer cover sheets for a sealed (stapled) bundle of the confidential copies accumulated by the apparatus.

Figure 8:
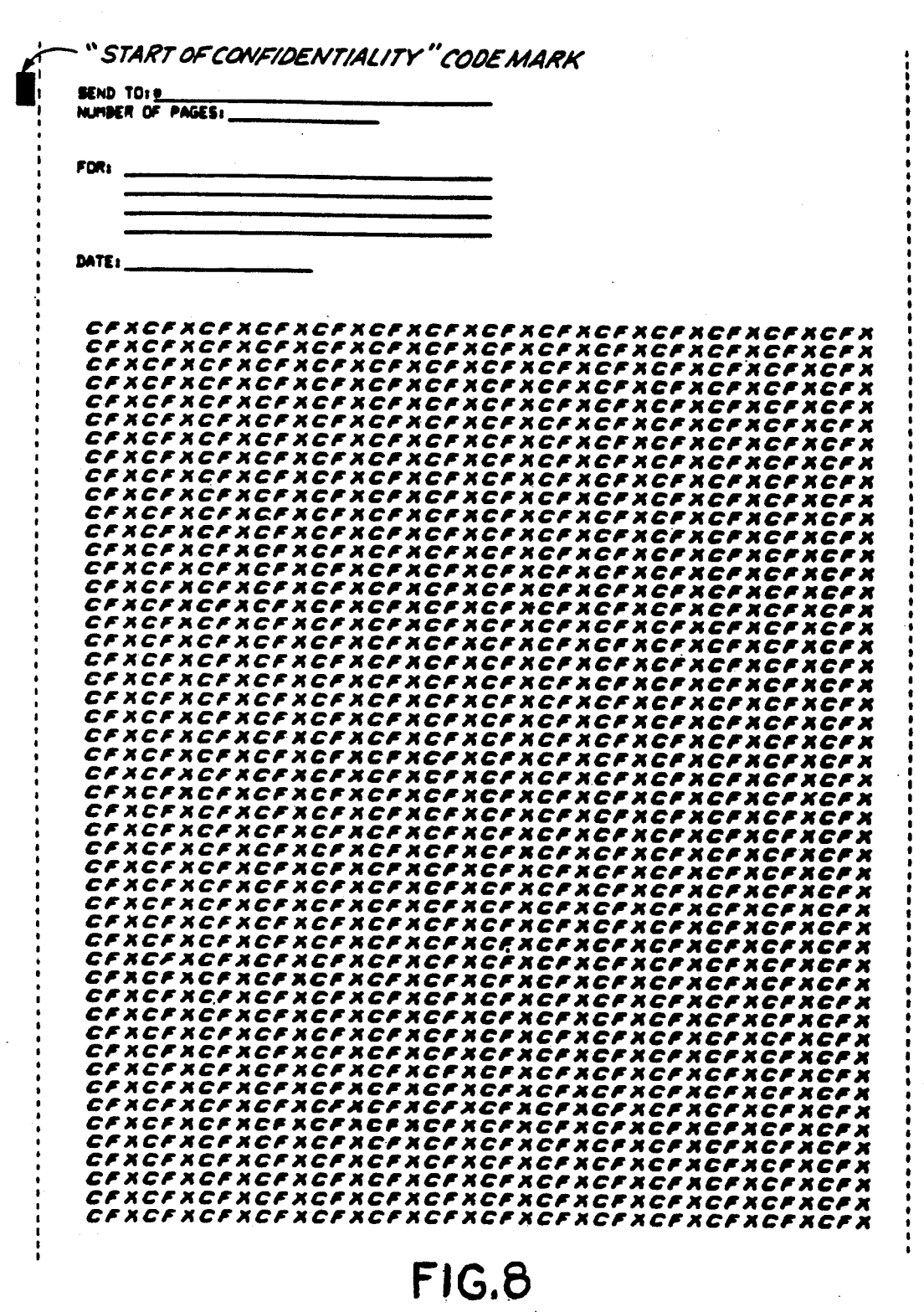

In general, individual document copies are discharged from an electrographic machine such that the top sheet is exposed, and thus readable. Therefore, to provide privacy for confidential information or messages, discipline is required by the sender at the reproducing or transmitting machine to insure that, when transmitting a confidential message, the first sheet P contains at least a "start of confidentiality" code or mark, represented by the solid black rectangular are in the upper left margin on the face of the first sheet P, as shown in FIG. 8.

This code or mark may comprise, for example, a solid black rectangle (as is employed in one embodiment of the invention), but it is understood that other confidentiality code marks may also be employed. Other embodiments of the code mark, as will be apparent to one skilled in the art, may include a specific pattern or bar code as the code for switching into and out of the confidentiality mode. Of course, the appropriate circuitry, common to one skilled in the art, may be employed to recognize such patterns or codes.

The first sheet P will become the bottom sheet in the bound document. The last sheet P transmitted will become the top cover sheet of the delivered document. Each confidential message sent from the transmitting terminal must be completed with the top cover sheet (shown in FIG. 9) containing an "end of confidentiality" code and no confidential information. While this sheet may advantageously also include the addressee and addressor information, it must contain an "end of confidentiality" code mark, that may be, in one embodiment, represented by the solid black rectangular area in the lower left margin on the face of the last sheet P.

Furthermore, when utilizing the disclosed apparatus and method of the invention, it is not essential that the facsimile reproduction paper be essentially opaque because a heavy printed pattern is provided on the top and bottom cover sheets which advantageously serves to prevent the reading of the contents through the cover sheets.

Figure 2:
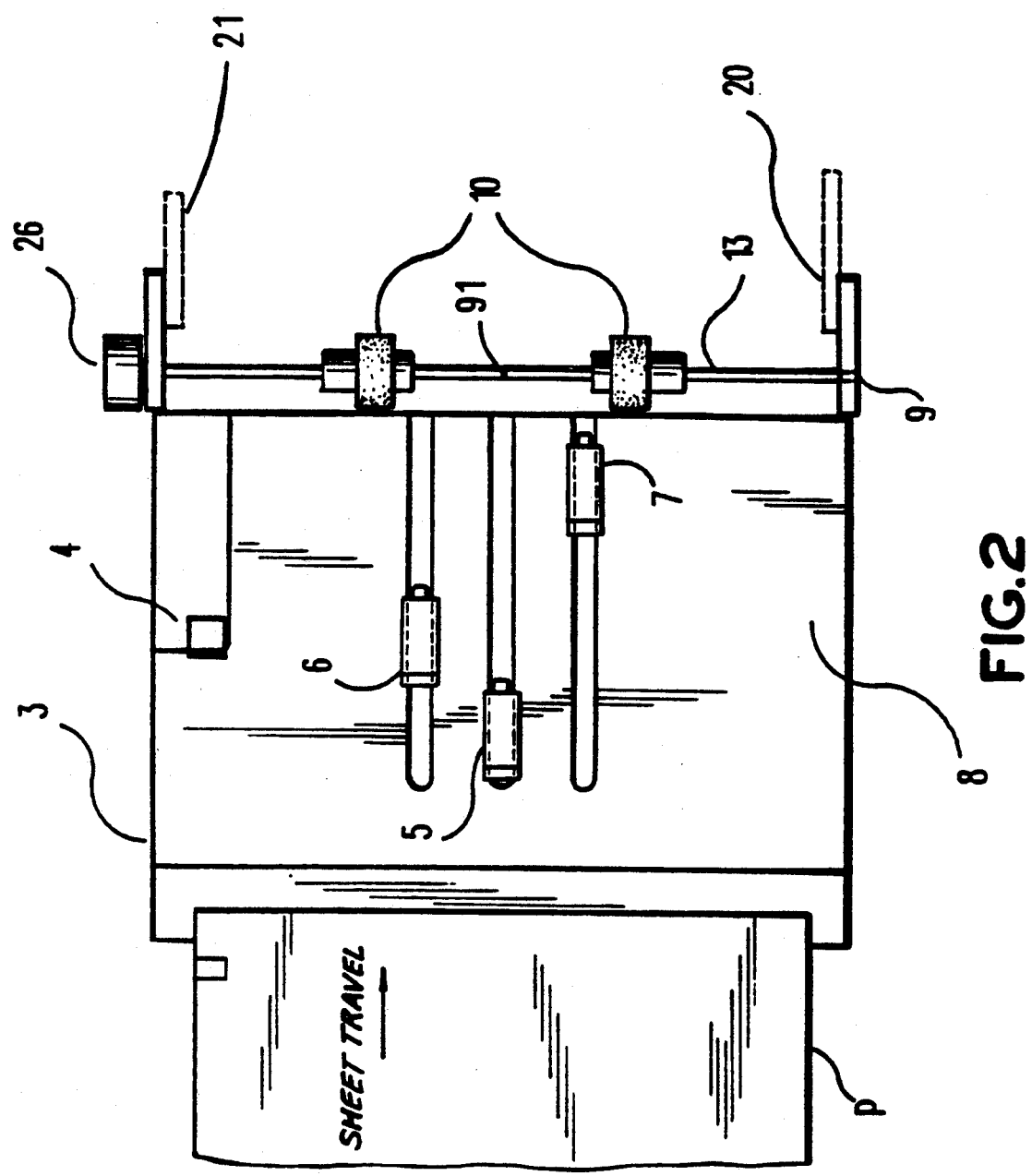
FIG. 2 is a fragmentary diagram illustrating (from a top view) a sheet containing a confidentiality mark entering a receiving paper tray. Certain parts are omitted for clarity.

Attention is no directed to FIG. 2 wherein receiving paper tray 3 is shown in greater detail. As shown, photo-optic sensor 4, a first microswitch 5, a second microswitch 6 and a third microswitch 7 are mounted on a guide plate 8 located immediately over and across receiving paper tray 3. Microswitches 5, 6 and 7 are advantageously mounted so that the arms of all three microswitches project through slots in guide plate 8, as shown in FIGS. 1, 2, 3 and 4. Guide plate 8 is utilized to guide moving sheets P, and prevent sheets P from lifting up off of receiving paper tray 3.

It should be noted that the microswitches featured may comprise, for example, the mechanically actuated type that are commonly encountered by those skilled in the art, but it is understood that they are not so limited. It will be apparent to one skilled in the art that the particular type of paper sensing device employed is not limited to a mechanically actuated switch for the purpose of detecting the presence or absence of a sheet of paper. Accordingly, other sensors known in the art may be used to accomplish a similar result.

Figure 10:
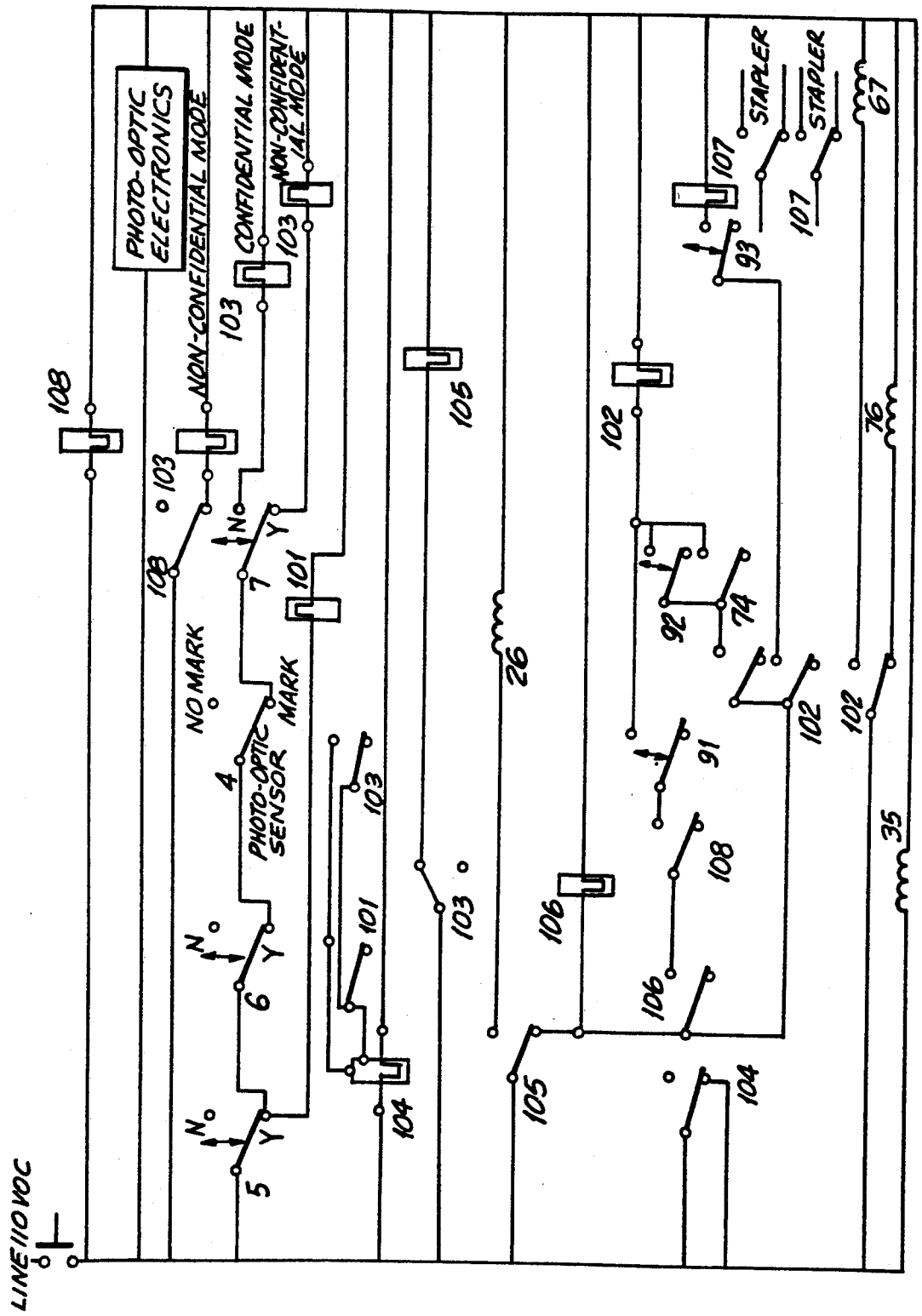
FIG. 10 is a schematic diagram of the control circuitry of the apparatus.

Referring to FIG. 2 in combination with FIG. 10, as sheet P is advanced down receiving paper tray 3, microswitch 5 is engaged by the leading edge of sheet P. Closing microswitch 5 activates power to a relay 101 (shown schematically only, in FIG. 10) whose closing contact resets and thereby activates a time delay relay 104 (shown schematically only, in FIG. 10).

Time delay relay 104 in turn provides power for a predetermined duration of time to a drive motor 35 mounted on side frame 20, and a pinch roller solenoid 76 (shown schematically in FIG. 10). Advantageously, power to drive motor 35 and pinch roller solenoid 76 is disconnected after the predetermined time period elapses, unless it is restarted by a subsequent advancing sheet P, that actuates microswitch 5 again.

Photo-optic sensor 4 may be mounted along the left edge margin (when viewed from the top down) of receiving paper tray 3, over a cut out slot so as to detect a confidentiality code mark, that may be present on the face of an advancing sheet P. Photo-optic sensor 4 is positioned such that the leading edge of an advancing sheet P passes under it after contacting microswitch 5, but before sheet P contacts microswitch 6. It will be appreciated that photo-optic sensor 4 is preferably of the infrared type common to one skilled in the art, but it is not so limited.

As sheet P is advanced past microswitch 6, microswitch 6 is actuated, while microswitch 5 is still engaged, thereby causing the output contacts of photo-optic sensor 4 to be coupled in series with microswitches 5 and 6. This ensures that the presence of a sheet P is below photo-optic sensor 4 prior to photo-optic sensor's 4 output contacts being coupled by the actuating of microswitch 6.

Notably, photo-optic sensor 4 is operating only for the duration that paper is detected by microswitch 5 and microswitch 6 in receiving paper tray 3, so as to avoid a possible situation wherein photo-optic sensor 4 would falsely detect a confidential mode code mark when no paper at all was present in receiving paper tray 3. The limited operation of photo-optic sensor 4 also allows CFX 1 to be switched, or toggled, between the confidentiality mode and non-confidentiality mode depending on, where on sheet P a confidentiality code mark is detected, as will be explained hereinafter.

When the CFX 1 is initially powered on, a time delay relay 108 (shown schematically only, in FIG. 10) resets a latch relay 103 (which allows the apparatus to operate in either the non-confidential or confidential mode) to a standard non-confidential mode.

After the initial power on, a switching or toggling of latch relay 103 into the confidentiality mode can only occur when the combination of microswitch 5 is engaged, microswitch 6 is engaged, microswitch 7 is not engaged, and photo-optic sensor 4 detects a confidentiality code mark below it. Accordingly, only a confidentiality code mark placed on the leading edge of advancing sheet P (as shown in FIG. 8) will trigger the confidentiality mode of CFX 1.

After moving sheet P advances past microswitch 6 in receiving paper tray 3, sheet P engages microswitch 7 so as to toggle or set back latch relay 103 (shown schematically only, in FIG. 10) to the non-confidential mode. Notably, this will occur only when sheet P contains a confidentiality code mark located near the trailing edge of sheet P (i.e., a sheet with an "end of confidentiality" code mark, as shown in FIG. 9).

Thus, to set CFX 1 back to the non-confidentiality mode, microswitch 5 must be engaged, microswitch 6 must be engaged, microswitch 7 must be engaged, and photo-optic sensor 4 must detect a confidentiality code mark below it. This can only occur when the confidentiality code mark is not placed near the leading edge of sheet P. Likewise, if sheet P does not contain such "end of confidentiality" code mark, the advancing sheet P will not trigger a change to the non-confidential mode, even thought it actuates microswitch 7.

Referring now to FIG. 3, after power is applied, drive motor 35 continuously rotates both drive rollers 11 and 17. Rotation of drive roller 11 is accomplished through the coupling of a drive motor pulley 36, secured to drive motor 35, with belts 38 and 39 and a center pulley 37. Likewise, drive motor pulley 36 is coupled to drive roller 17 through belts 39 and 40 and center pulley 37, respectively.

Figure 4:
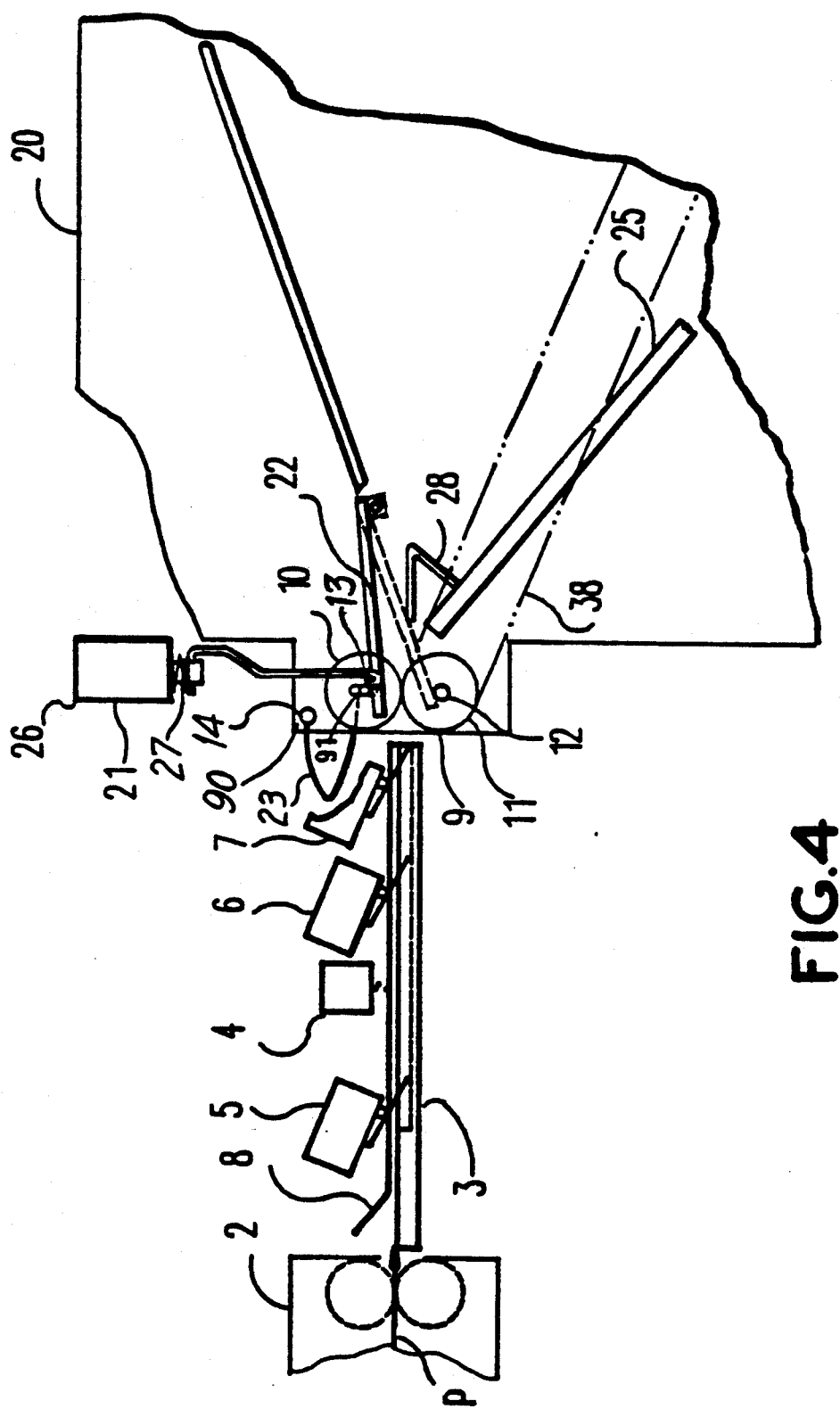
FIG. 4 is a diagram of a fragmentary cross-sectional view of the input portion of the apparatus.

After engaging microswitch 7, advancing sheet P is transported across receiving paper tray and into the nip between the sets of idler rollers 10 and drive rollers 11 of input roller assembly 9, located adjacent to the proximal edge of receiving paper tray 3 (as shown also in FIGS. 1, 3 and 4).

Referring now to FIG. 4, drive rollers 11 of input roller assembly 9 are rotatably mounted on shaft 12, supported on each end by bearings for appropriate rotating motion (not shown, for clarity), and attached to side frame 20 and 21. Separately, idler rollers 10 of input roller assembly 9 are rotatably mounted on shaft 13 which is mounted by its ends in slots (in side frames 20 and 21), that permit the rotation of shaft 13, and the limited travel of shaft 13 in the vertical direction only.

Additionally, a line-up shaft 14, mounted above and parallel to idler roller shaft 13 is secured by its ends to side frames 20 and 21 respectively. Shaft 14 may contain a compression spring 23 attached at one end 90 on shaft 14 and the other end 91 on idler roller shaft 13. Spring 23 applies a downward resistance to the vertical travel of idler roller shaft 13 as sheet P passes between idler rollers 10 and drive rollers 11.

In the non-confidential mode, i.e., when no confidentiality code mark appears on the face of the first sheet P traveling through receiving paper tray 3 (referring now to FIG. 3), a sheet passing across receiving paper tray 3 and through input roller assembly 9 is thereafter diverted along an upper paper path into the nip between idler roller 16 and drive roller 17 of output roller assembly 15 located adjacent to the proximal edge of exit tray 24.

Similar to input roller assembly 9, output roller assembly 15, as shown in FIG. 3, is also comprised of a set of upper idler rollers 16 rotatably secured to shaft 18, and a set of lower drive rollers 17, also rotatably secured to a shaft 19. Shaft 19 is likewise supported on each end by bearings (not shown, for clarity) attached to side frames 20 and 21. Shaft 18 is mounted by its ends to side frames 20 and 21 in slots (not shown) that permit the rotation and the limited travel of shaft 18 in the vertical direction only. Output roller assembly 15 delivers sheets P from the upper paper path into exit tray 24, for removal by an operator.

Alternatively, when sheet P that is being fed into receiving paper tray 3 contains a confidentiality code mark (referring momentarily to FIG. 10), latch relay 103 is toggled from the non-confidential mode to the confidential mode by the simultaneous actuation of microswitch 5 and microswitch 6 and the detection of a confidentiality code mark by photo-optic sensor 4.

By toggling latch relay 103, power is de-energized in a time delay relay 105 (shown schematically only, in FIG. 10). Time delay relay 105 then switches its contacts so that energy is provided to a deflector solenoid 26, which may be mounted on side frame 20 or 21, and connected to diverter gate 22.

Diverter gate 22, referring back to FIG. 3, is pivotally mounted on one end to side frame 20 and on the other end to side frame 21, and adjacent to input roller assembly 9. Diverter gate 22 may be positioned in either the solid or dotted line positions shown in FIGS. 3 and 4.

When diverter gate 22 is in the dotted-line position, non-confidential sheets P are directed along the upper path to exit tray 24. When diverter gate 22 is in the solid-line position, confidential sheets P travel along a lower paper path into assembly tray 25. Notably, diverter gate 22 contains slots cut away (not shown) so as not to make contact with any rollers of input roller assembly 9, when in either the up or down position.

Diverter gate 22 can advantageously be moved between its two positions in response to the energizing and de-energizing of deflector solenoid 26 (shown in detail in FIG. 4). A compression spring 27 urging the inner cylinder of diverter solenoid 26 outward is utilized to overcome any initial resistance of diverter gate 22 to return to its dotted-line non-confidential position. It will be observed that diverter gate 22 is normally in its dotted-line position so that a sheet P passes directly through input roller assembly 9 and to the upper paper path unless a confidentiality signal is received to energize deflector solenoid 26 and move diverter gate 22 to its solid line position.

In the confidential mode, diverter gate 22 is held in the up (solid-line) position, permitting sheet P passing through input roller assembly 9 to enter into the lower paper path, namely the area of the assembly tray 25. Assembly tray 25 is dimensioned to accommodate different paper sizes, for example, letter size or even legal size, but it will be apparent to one skilled in the art that it is not so limited. Furthermore, assembly tray 25 is advantageously inclined such that sheet P traveling across it is advanced downstream by its own weight.

Upon entering the area of assembly tray 25, the leading edge of moving sheet P is first guided over platten 28 (shown in FIGS. 1, 3, and 4), located at the upper edge of assembly tray 25. The function of platten 28 is to lift and place the leading edge of moving sheet P over the trailing edge of any sheets P that may be already present in assembly tray 25, advantageously avoiding any paper jamming or misfeeding. Notably, assembly tray 25 may also include a protruding ridge (not shown) located in the center of assembly tray 25 and parallel to the direction of sheet movement that serves to reduce the surface friction between sheets P as they travel downstream across assembly tray 25.

As sheet P advances across assembly tray 25, it moves under a pair of top guides (not shown, for clarity) which deflect sheet P downwardly during its travel and assist in holding copies flat. The top guides may each be comprised, for example, of a rigid flexible strip, such as a metallic strip, running along the inclined length of each side of assembly tray 25, for the purpose of urging sheets P into a stack.

Sheet P continues traveling downward through assembly tray 25 where it passes over lower drive roller 61 located near the lower end of assembly tray 25 (as shown detailed in FIG. 7). Lower drive roller 61 is mounted on shaft 62 perpendicular to the direction of paper travel and located in a plane beneath assembly tray 25, such that the outer surface of drive roller 61 protrudes above the surface of assembly tray 25, through a slot (not shown) in the lower end of assembly tray 25. Notably, the ends of shaft 62 are supported by bearings (not shown, for clarity), for appropriate rotating motion and are attached to side frames 21 and 21, respectively.

During its travel, the left and right sides of advancing sheet P pass through the throat of stapler 70 mounted on one side of the lower end of assembly tray 25, and the throat of stapler 71 mounted on the opposite side of the lower end of assembly tray 25. Advancing sheets P come to a stop upon engaging holding gate 66 (as shown in the solid-line position in FIG. 7). Accordingly, a plurality of sheets P delivered seriatim into assembly tray 25 can be received one on top of the other and held by holding gate 66 to form a stack or bundle of sheets P.

Referring now to FIGS. 7 and 10 in combination, after confidential sheets P ar accumulated in assembly tray 25 and the last sheet P, a confidentiality top cover sheet as shown in FIG. 9, passes under photo-optic sensor 4, latch relay 103 is reset to a non-confidential mode. This causes the contacts in latch relay 103 energize time delay relay 105.

After a delay period lapses for allowing confidentiality top cover sheet P to pass below diverter gate 22 and fully settle in assembly tray 25, the contacts of time delay relay 105 close.

The closing of the contacts of time delay relay 105 causes power to be switched from deflector solenoid 26 to circuitry that controls the delivery and binding of the accumulated bundle as it is advanced from assembly tray 25 to storage tray 80. De-energizing deflector solenoid 26 allows diverter gate 22 to return down to its non-confidential position where it remains until a confidentiality code mark is detected on a later incoming sheet.

As shown in FIG. 10, switching the contacts of time delay relay 105 actuates a time delay relay 106 by supplying power to it. Time delay relay 106 then closes its contacts to provide power to an open microswitch 91 through the contacts of time delay relay 108, which will have been switched to a closed position several seconds after time delay relay 108 is initially powered on. As mentioned above, time delay relay 108 is energized when CFX 1 is initially powered on.

Further explanation of the operation of the invention, is described with reference to FIGS. 1, 3 and 5. A puck drive assembly 50, of the type common to one skilled in the art but not so limited, is located on side frame 20, offset from the location of drive motor 35. Puck drive assembly is driven by drive motor 35 via the combination of belt 39 trained around drive pulley 36 and center pulley 37, and drive belt 41 trained around center pulley 37 and a puck driver roller 51.

Figure 5:
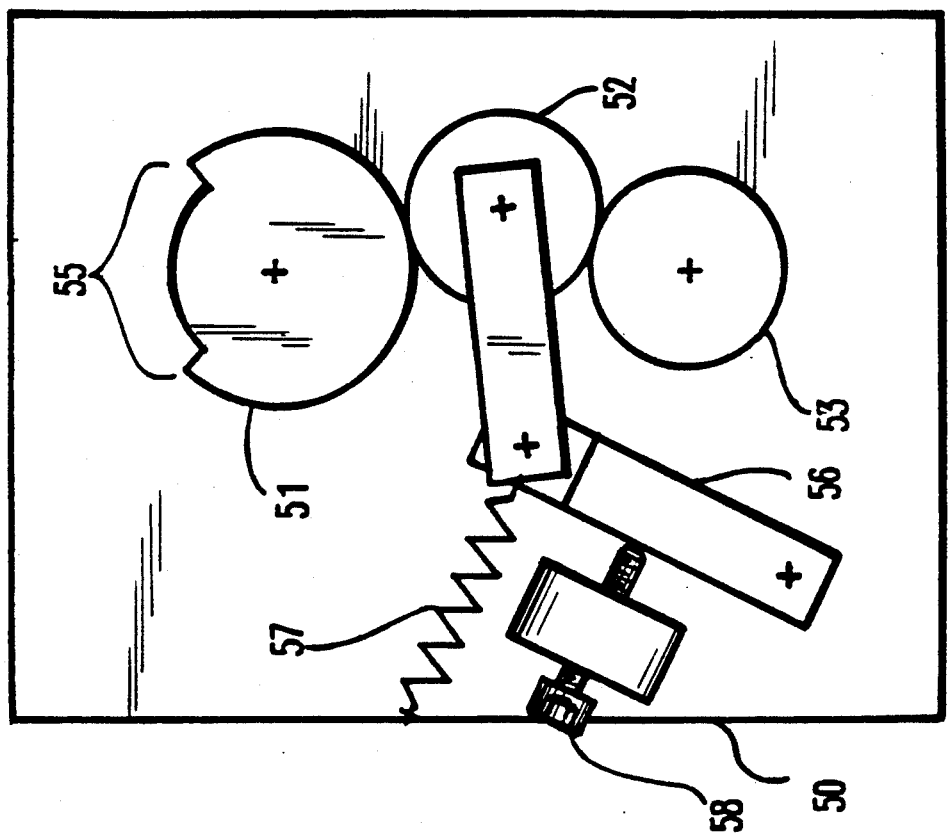
FIG. 5 is a diagram of a fragmentary cross-sectional view of the puck drive mechanism with certain parts omitted for clarity.

Attention is drawn to the outer circumference of puck drive roller 51, detailed in FIG. 5. As shown, a portion, designated 55, of the outer surface of puck drive roller 51, is removed or cut away (resulting in a smaller inner diameter for the portion thereof). This is provided so that rotation of puck drive roller 51 results in intermittent driving contact with a roller 52. This in turn causes the rotation of an idler roller 53 to be noncontinuous, for the duration that the smaller diameter portion of puck drive roller 51 is rotating past (and not in contact with) roller 52. Accordingly, the rotation of drive roller 61 in FIG. 7, which is coupled to idler roller 53 through belts 63 and 64, and an idler pulley 65, is also noncontinuous.

Notably, the position of roller 52 with respect to puck drive roller 51 is maintained constant even when cutout 55 is rotating past it, through the use of a pivotally secured arm assembly 56, return spring 57 and stop screw 58. These components cooperate to pull roller 52 into driving engagement with puck drive roller 51, but simultaneously prevent it from being pulled into contact with the roller surface at cutout 55.

Figure 6:
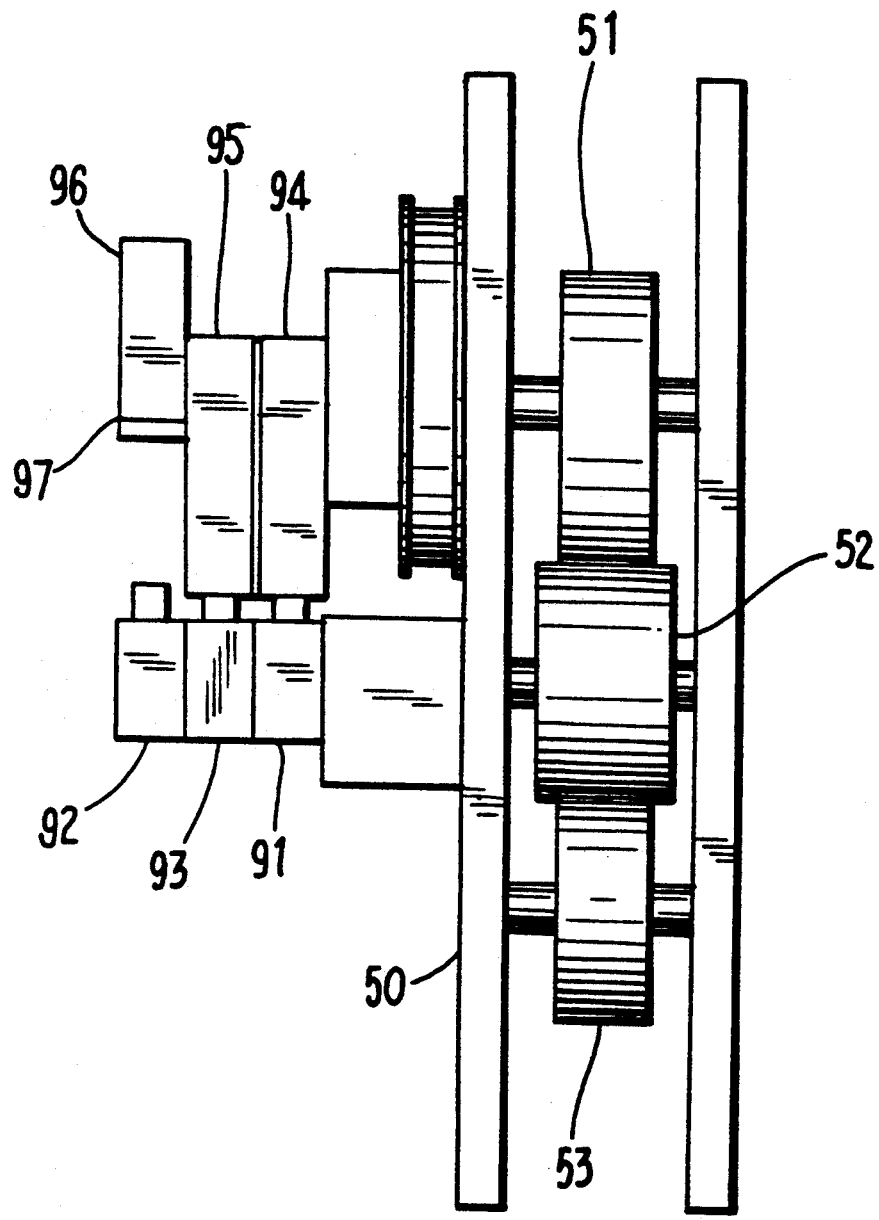
FIG. 6 is a diagram of a fragmentary enlarged view of the puck drive mechanism as viewed from the side.

Referring now to both FIGS. 6 and 10, microswitch 91 (shown schematically in FIG. 10, and diagrammatically in FIGS. 1, 3 and 6), is located adjacent and in cooperation with a cam arm 94 mounted on a shaft 97 of puck drive assembly 50. Microswitch 91 is mounted such that the rotation of cam arm 94 causes microswitch 91 to be actuated once per revolution of cam arm 94.

The closing of the contacts of microswitch 91 by cam arm 94 energizes a relay 102 (shown schematically only, in FIG. 10). Advantageously, cam arm 94 is aligned to actuate microswitch 91, and therefore relay 102, at the instant when puck drive roller 51 is not in contact with roller 52. This is at the start of a non-motion period of drive roller 61 which, as mentioned above, is indirectly coupled to roller 52.

One set of the contacts of actuated relay 102 switches power from a pinch roller solenoid 76 to a holding gate solenoid 67. As a result, the energizing of holding gate solenoid 67 causes holding gate 66 to be pivotally lowered from the solid-line position shown in FIG. 7 to the dotted-line position also shown in FIG. 7. This allows the bundle collated in assembly tray 25 to be transported into lower storage tray 80.

Simultaneously with the energizing of holding gate solenoid 67, pinch roller solenoid 76 is de-energized and a return spring 71, attached to a connecting rod 72 of pinch roller solenoid 76, retracts connecting rod 72, thereby lowering a pinch roller assembly 73 from the solid-line position to the dotted-line position shown in FIG. 7.

Notably, pinch roller assembly 73 comprises pinch roller 75 located near the center of pinch roller assembly 73, and a microswitch 74 located near the distal edge of pinch roller assembly 73. Microswitch 74 is used for detecting the presence of a sheet P in assembly tray 25.

When pinch roller assembly 73 descends, pinch roller 75 comes into driving engagement with the upper surface of the stack (or bundle) resting over drive roller 61, thereby advancing the bundle from assembly tray 25 into lower storage tray 80, in synchronization with the start/stop rotation of drive roller 61. Accordingly, the driving of the bundle by the intermittent rotation of drive roller 61 results in a intermittent start/stop delivery of the bundle of sheets P through the throats of staplers 70 and 71.

Microswitch 74 becomes actuated upon the lowering of pinch roller assembly 73 on to the upper surface of the top sheet P stacked in assembly tray 25. Engaging microswitch 74 actuates double-throw contacts of relay 102, causing power to be applied to a relay 107 (shown schematically only, in FIG. 10), for triggering the firing ram of staplers 70 and 71.

Directing attention to FIGS. 6 and 10, a microswitch 93 is actuated once per revolution of the intermittent drive cycle by a cam arm 95 located on shaft 97. Engaging microswitch 93 in turn actuates the contacts of relay 107 that specifically trigger the firing rams of staplers 70 and 71 during the rotation period when puck drive roller 51 is not in contact with roller 52, in effect firing during a stop period of the start/stop rotation of drive roller 61.

Specifically, the firing of the staplers 70 and 71 is synchronized with the start/stop motion of the advancing bundle, such that staples are driven along the left and right margins of the bundle at the instant that the motion of the moving bundle is stopped.

In one embodiment, four (4) evenly spaced staples may be driven along the length of the left and right margins of a bundle comprised of letter sized sheets P. Alternatively, five (5) evenly spaced staples may be driven along the length of the left and right margins of a bundle comprised of legal sized sheets P. Of course, it will be apparent to one skilled in the art that the number of staples driven is not critical to the invention, and any number of staples for providing confidentiality may be used.

A microswitch 92 (shown schematically in FIG. 10, and diagrammatically in FIGS. 1, 3 and 6) Microswitch 92 also located on shaft 97 of puck drive assembly 50 shown in FIG. 6. Microswitch 92 is also actuated once per revolution of a cam arm 96. Microswitch 92 performs the function of preventing relay 102 from un-latching when the trailing edge of the advancing bundle of sheets P clears microswitch 74 and opens its contact.

By holding relay 102 latched and thus maintaining power to relay 107, staplers 70 and 71 are permitted to drive an additional staple in each side of the bundle after the advancing bundle no longer contacts microswitch 74. Advantageously, pinch roller assembly 73 remains in the lowered position allowing it to properly advance the bundle into storage tray 80.

The completed set of confidential sheets P, secured by the plurality of staples along the left and right margins of the bundle, is discharged into lower storage tray 80 and stacked with other sets of secured confidential papers.

Lastly, microswitch 92 opens during the next motion period to release relay 102. Concurrently, pinch roller assembly 73 and holding gate 66 are returned to their upright positions (as depicted by the solid line positions shown in FIG. 7).

While the apparatus and method of security disclosed in the invention may not provide absolute physical security for the document, it does make accessing the confidential document a lot more troublesome for an unwanted intruder or passerby. The degree of difficulty of the penetration is notably increased by the stapling together of the confidential sheets whose message content is hidden by the top cover sheet P.

Additionally, a desirable feature to add convenience to the system would be to utilize a facsimile paper which has been perforated along each edge with a margin adequate to permit stapling. This would assist the recipient of the confidential bundle or document in opening the bundle, by stripping off the perforated edge.

While the invention and its operation have been described in connection with a facsimile machine, it is apparent that the invention may be operated with other apparatuses that may be adapted to feed a stream of sheets seriatim into the CFX 1.

Furthermore, it will be understood that the invention may be a "stand alone" unit (separate from a facsimile machine) or it can be secured directly to another apparatus, such as the copier/duplicator.

Operation of the invention has been described primarily in connection with the production of sets of sheets wherein it is desirable to maintain the message content private from unintended recipients, as occurs when a set of confidential document sheets are transmitted by a facsimile machine. However, it will be understood that the described method and apparatus can also produce booklets of documents that do not require confidentiality, by utilizing the invention with only one stapler firing, so that only one side of the bundle of sheets is bound. Any sheets can be bound together to form booklets by using the apparatus of this invention.

Figure 11:
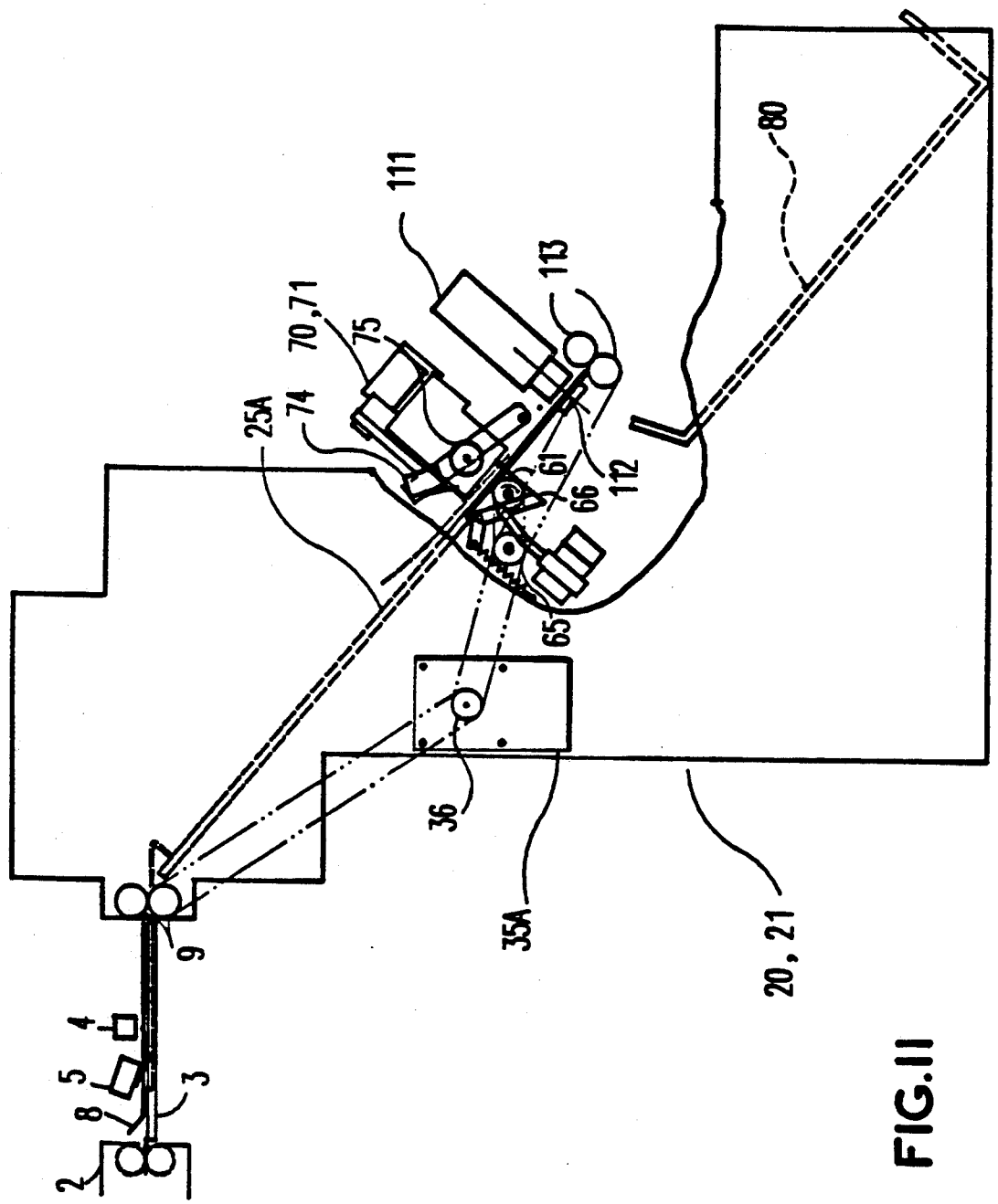
FIG. 11 is a diagram of the partially cut away cross-sectional view of another embodiment of the apparatus for maintaining confidential the printed-sheet output of an electrographic machine.

Turning to FIG. 11, a modified apparatus and method for binding sets of sheets P is shown. Certain parts of the apparatus shown in FIG. 11 are identified by the same numbers used for parts in FIGS. 1, 3, 4, and 12 indicating that such commonly identified parts have similar structure and/or function.

The embodiment of the apparatus shown in FIG. 11 differs from the embodiment of the apparatus shown in FIGS. 1-7 in several aspects. To begin, all sheets P of paper are delivered to on output tray for removal by an operator. In the embodiment of FIG. 11, only one path for delivering a sheet P passing through input roller assembly 9 is utilized, and the sheets P containing both non-confidential message and confidential message are delivered to the same storage tray so.

Notably, non-confidential messages are bound differently from confidential messages before they are delivered to storage tray 80. For example, non-confidential messages may be bound on one side, for easier handling, while it is anticipated that a confidential message may be bound on all four sides to provide additional privacy for the message.

The embodiment shown in FIG. 11 does not provide the upper paper path and its associated parts, as are provided in the embodiment of FIGS. 1, 3, and 4. For example, the apparatus shown in FIG. 11 does not include the diverter gate 22, deflector solenoid 22, output roller assembly 15, exit tray 24, and drive belt 40 that are present in the apparatus shown in FIGS. 1, 3, and 4.

Additionally, there are variations between the two apparatuses for distinguishing the confidential messages from the non-confidential messages. Although it is anticipated that the method for distinguishing between confidential and non-confidential documents contemplated in the embodiment of FIGS. 1, 3, and 4, will also be practiced in the embodiment of FIG. 11, some differences for carrying out the method do exist.

Namely, the photo-optic sensor 4 in the embodiment of FIG. 11 may be coupled to programmable control logic for reading bar codes or other coded indicia off of the face of the sheet P passing below. For example, one bar code technique that may be utilized when practicing the invention embodied in FIG. 11 is the scanning for representations encoded in the Universal Bar Code format. The Universal Bar Code is a well known encoding format that is practiced today in many commercial applications, and need not be described here in detail.

However, as will be apparent to a person skilled in the art, the particular details of the encoded indicia or the technique used to scan coded instructions off the face of a document are not critical to the present invention. Thus, any suitable technologies for accomplishing the foregoing scanning function may be used without departing from the essential spirit of the invention.

The scanning technique used in the embodiment of FIG. 11 allows the receiving paper tray 3 with photo-optic sensor 4 to detect the presence of confidentiality indicia on a sheet P passing through, without the use of microswitch 6 and microswitch 7 for providing a limited "window" for viewing a confidentiality mark, as practiced in the embodiment of FIGS. 1-4.

The reading of a specific coded indicia allows a better ability to recognize the first or last sheets P of a confidential message while avoiding scanning problems produced by stray marks on the output print or dirt in the receiving paper path. Advantageously the detection of a specific coded indicia allows the CFX 1 to distinguish between confidential and non-confidential messages from predetermined codes that are present only on the last sheet of a confidential message, or on the last sheet of a non-confidential message.

Turning now to the delivery arrangement of the embodiment shown in FIG. 11, the functions of the drive motor 35 and the puck drive assembly 50 shown in the embodiment of FIGS. 1, 3, 5, and 6 are provided for by a digital stepper motor 35A, of the type common in the industry.

When the drive motor 35A is transporting sheets P into an assembly tray 25A, the drive motor 35A is driven in a continuous manner. Alternatively, when a set of sheets P is transported from assembly tray 25A into storage tray 80, the drive motor 35A is digitally stepped by a programmed control that uses techniques well known in the art. This provides an intermittent motion for determining the displacement of sheets P between staple positions.

With the puck drive assembly 50 not present in this latter embodiment, the belt drives from drive motor 35A in FIG. 11 go directly to input roller assembly 9 and to output roller 66 in the same locations as shown FIG. 1, rather than through puck drive assembly 50 as shown in the embodiment in FIGS. 1, 3, and 5.

The arrangement of FIG. 11 also differs in the arrangement of FIG. 1 by the addition of a dual traverse sheet stapler 111 head that is mounted on extended assembly tray 25A. The sheet stapler 111 is mounted downstream from staplers 70, 71 and directly above and across the path of a set of sheets P being advanced to storage tray 80.

A dual transverse sheet stapler 111 or the like, such as those used in magazine binding and saddle stitching, is used to provide the stapling of a set of sheets P containing confidential messages along its leading and trailing edges. Thus, with the side stapling performed by staplers 70 and 71, stapling along all four edges of the set of sheets P containing confidential messages is accomplished to provide additional security to the packet.

Stapling all edges of the packet, rather than stapling only the two lengthwise edges provides more protection of the contents contained therein from inspection by someone other than the intended recipient.

To hold the packet when the staples are applied to its trailing edge, a delivery roller assembly 113 is provided. This arrangement is necessary since the last staples applied across the trailing edge require the packet to be held and stapled before being delivered to storage tray 80. Delivery roller assembly 113 is belted serially to drive motor 35A through pulley 65.

The operation of the modified apparatus shown in FIG. 11 will now be discussed. In general, to transmit a confidential message a bar code or the like may be utilized on the first and last sheets P, or alternatively, on the last sheet P of the message. The last sheet transmitted becomes the top sheet of the received message in assembly tray 25A.

Specifically, when the first sheet P of the transmitted confidential message enters the receiving paper tray 3, the scanner reads the bar code or the like if present and recognizes that a confidential message is being received. The CFX 1 is now set to the confidential message mode. In this mode, the scanner also requires the detection of a code on the final sheet, which is identical to the code on first sheet, to trigger the system to discharge the message as a confidential packet to the storage tray 80.

Alternatively, a predetermined code present on the last sheet P may also be used to cause the CFX 1 to discharge the message as a confidential packet.

If a first sheet P without a bar code enters the receiving paper tray 3, the CFX 1 will be set to the non-confidential message mode. The CFX 1 will continue to accept sheets P as non-confidential until it detects the last sheet P of the non-confidential message.

Accordingly, the final sheet of the non-confidential message may contain a predetermined code, different from the predetermined code for effecting a confidential mode, that will set the CFX 1 to discharge the message as a non-confidential packet. After the end of message code is detected, the contents of the assembly tray 25A are transported to the storage tray 80.

In both the confidential and non-confidential modes, the holding gate 66 in the assembly tray 25A is the same as in the embodiment of FIGS. 1 and 7 and performs the same function of aligning and holding the sheets until delivery to the storage tray 80. As in the embodiment of FIG. 1, pinch roller 75 advances the packet during the stapling operation. However, in the latter embodiment, the pinch roller 75 advances the packet until it is picked up and fed by output rollers 113 shown in FIG. 11.

The microswitch 74 shown in FIG. 7 and FIG. 10 plays a different roll in the embodiment of FIG. 11. Upon detecting the trailing edge of the packet, it effects immediate retraction of the pinch roller 75 and also enters a signal to the digital stepping motor control to initiate a final sequence action. The packet is now transported by output rollers 113, which intermittently stop the packet for the final stapling and delivery to the storage tray 80.

The following details the reception and delivery of a confidential message through the apparatus embodied in FIG. 11. Initially, a sheet P appearing at receiving tray 3 closes microswitch 5 and activates power to the drive motor 35A. As the sheet traverses receiving tray 3, the photo-optic sensor 4 scans it for a unique bar code.

If the code is detected on the first sheet P, the confidentiality sequence will be followed in the delivery mode. Failing to detect this code causes the non-confidential sequence to be followed during the delivery of the sets of sheets from the assembly tray 25A to the storage tray 80. However, as described above, a predetermined code on the last sheet P may also cause the CFX 1 to follow the confidentiality sequence of delivery.

After passing through the receiving paper tray 3, the sheet P descends into assembly tray 25A where it is stopped and held in position by holding gate 66. Subsequent sheets proceed in the same fashion. When the last message sheet arrives it will be in the coded sheet format displaying a series of unique code marks and spacing which the photo-optic sensor 4 can identify.

Assuming that the unique code mark is on the first or last sheet of the message to indicate confidentiality, the CFX 1 will first provide a delay to allow the final sheet to descend into assembly tray 25A so that its leading edge will reach the holding gate 66. The CFX 1 will than activate the pinch roll solenoid 76 to cause the pinch roller 75 to drop onto the face of the top sheet P, so as to engage the stack of sheets P with drive roller 61.

The digital stepping motor 35A will now provide a delivery sequencing for the various operations involved such as moving, stopping, and stapling the set of sheets P. As dictated by the machine configuration, the first staples applied will be the forward two side staples (one on each side) by staplers 70 and 71.

Drive roller 61 will advance the packet until the leading edge is appropriately positioned under stapler 111 for the leading edge transverse staples. It is anticipated that the distance between staplers 70 and 71 and stapler 111 may be less than the distance between side stapling positions. If it is greater, the next stop motion of the packet will sequence action for another set of side staples before the end staples are applied.

Successive advancing and stopping of the packet will be at preassigned positions, so that the edge stapling can be applied on both sides. The stapling along both sides of the packet of sheets P continues until the trailing edge of the packet clears microswitch 74. Microswitch 74 is preferably positioned in advance of the last set of side staples that are placed in the packet of sheets P after its trailing edge is detected by microswitch 74.

Instead of advancing to another side stapling position after the last staple placement, the packet is now advanced to a preset position so that transverse staples may be placed along its trailing edge. Notably, before the packet of sheets P is advanced to the last stapling position, the trailing edge of the packet will have cleared the drive roller 61 and the packet will be advanced solely by the output rollers 113.

After the trailing edge transverse staples have been placed, the packet will be delivered to storage tray 80. During this last transport, the drive motor 35A will have switched back to normal continuous operation, awaiting the arrival of a new message sheet.

The delivery operation during the non-confidential mode will now be described in detail. When the non-confidential mode has been set, i.e. when the first sheet enters the CFX 1 before the sheet containing the bar code or the like is received, or the code on the last sheet P indicates the presence of a non-confidential message, a different stapling operation is performed. In this mode, after the sheet P containing the indicia is received in assembly tray 25A, holding gate 66 is lowered and the set of sheets is advanced by pinch roller 75.

As the set of sheets is advanced into storage tray 80, drive motor 35A may stop the packet so that only one stapler 70, Or 71 may fire to bind one side. It will be understood that here are many permissible configurations for stapling the packet so that only one side may be bound together. For example, the advancing packet may be stapled several times along the length of one side, it may be stapled by only one staple along the one side, it may be stapled along only the leading edge, or only along the trailing edge, etc. As will be apparent to one skilled in the art, where the staples are placed is not critical to the invention, and any configuration of stapling that does not bind the set of sheets P on all four sides may be suitable for practicing the invention in a non-confidential mode.

It should be understood that the set of non-confidential sheets may also be delivered to storage tray so without any binding thereto.

As will be apparent to one skilled in the art, the length of sheet processed may be determined in the delivery after the packet has cleared the microswitch 74. However, it is contemplated in the present invention that the information on incoming sheet lengths may alternatively be determined by measuring the elapsed time for passage of the leading and trailing edge of each sheet P as the sheets enter the assembly tray 25A by using microswitch 5.

Knowing the length of the packet's longest sheet in advance, could, through preprogrammed logic, select various placements of the side staples. This may give optimum staple placement for different packet lengths after the sheet lengths are determined.

Lastly, all of the basic components included in the invention are well-known and commercially available from many sources. Those skilled in the art will appreciate that from the disclosure of the invention provided herein, commercial semiconductor integrated circuit technology would suggest numerous alternatives for actual implementation of the inventive functions of the CFX 1 that would still be within the scope of the invention.

Moreover, the invention has been described in detail with particular reference to several embodiments thereof, but it will be understood that the invention is capable of other and different embodiments, and its several details are capable of modifications in various obvious respects. As is readily apparent to those skilled in the art, variations and modifications can be affected within the spirit and scope of the invention. Accordingly, the foregoing disclosure, description, and figures are for illustrative purposes only, and do not in any way limit the invention, which is defined only by the claims.

We claim:

1. A method for providing confidentiality for information produced by electrographic devices comprising the steps of:
   receiving sheets having non-confidential information or sheets having confidential information, wherein said sheets having confidential information includes at least a last sheet having a confidential code and no confidential data;
   detecting said last sheet of said sheets having confidential information;
   delivering sheets along a sheet path comprising an assembly tray and a storage tray;
   accumulating said sheets delivered to said assembly tray into a set of sheets containing non-confidential information, or a set of sheets containing confidential information;
   delivering said sets from said assembly tray to said storage tray, after said last sheet of a set of sheets is delivered to said assembly tray; and
   binding said set of confidential sheets on its sides as said set is delivered from said assembly tray to said storage tray.

2. An apparatus for providing privacy for the message content in copy produced by electrographic devices, comprising:
   copy sheets further comprising confidential message and copy sheets further comprising non-confidential messages, wherein said confidential message includes a last copy sheet having a confidentiality code and no confidential message;
   means for detecting the presence of said last sheet of said copy sheets comprising confidential messages;
   an assembly tray for accumulating and assembling said confidential message into a set, or for assembling said non-confidential message into a set;
   a storage tray for receiving said set of confidential message from said assembly tray or for receiving said set of non-confidential message from said assembly tray:
   means for delivering said set of confidential message or said set of non-confidential message from said assembly tray to said storage tray; and
   a means for binding said set of confidential message together along the sides of said set of confidential message as said set is delivered from said assembly tray to said storage tray.

3. An apparatus for maintaining the confidentiality of printed material emanating from an electrographic device, and for binding a set of sheets having confidential information together to provide privacy for the information contained therein, comprising:
   means for receiving sheets delivered seriatim comprising one or more sheets having non-confidential information, and sets of sheets having confidential information;
   means for detecting first and last sheet of said set of sheets having confidential information;
   an exit tray for stacking said sheets having non-confidential information;
   means for delivering sheets having non-confidential information along a first sheet path to said exit tray;
   an assembly tray for accumulating and assembling said sets of sheets having confidential information;
   means for delivering sheets having confidential information along a second sheet path to said assembly tray, thereby collating into a set sheets having confidential information;
   a storage tray for receiving said set of sheets having confidential information from said assembly tray;
   means for delivering said set of sheets having confidential information from said assembly tray to said storage tray; and means for binding said set of sheets having confidential information along opposite sides as said set is delivered from said assembly tray to said storage tray.

4. The invention according to claim 3 further comprising sets of sheets having confidential information, wherein last sheet of said set delivered includes a confidentiality code and no confidential data, and first sheet of said set delivered includes at least said confidentiality code 5. The invention according to claim 4 wherein said means for detecting said first and said last sheet of said set of sheets having confidential information comprises a photo-optic sensor for detecting sheets having said confidentiality code thereon.

6. The invention according to claim 3 further comprising a deflector gate for directing sheets along said first sheet path leading to said exit tray, and for directing sheets along said second sheet path leading to said assembly tray.

7. The invention according to claim 3 wherein said means for delivering said set of sheets having confidential information from said assembly tray to said storage tray further comprises intermittently starting and stopping the delivery of said set of sheets having confidential information.

8. The invention according to claim 7 wherein said means for binding comprises a stapler having means for stapling said set of sheets having confidential information together during the stop motion period of said intermittent delivery of said set of sheets having confidential information from said assembly tray to said storage tray.

9. The invention according to claim 3 further comprising control means for controlling the operation of said apparatus, being effective to determine when said first sheet of said set having confidential information is received, said control means further being effective to direct said sheets of said set having non-confidential information along said first sheet path, and directing said set of sheets having confidential information along said second sheet path, and still further being effective to staple and deliver said set of sheets having confidential information from said assembly tray to said storage tray.

10. A method for providing confidentiality for information produced by electrographic devices comprising the steps of:
producing a stream of copy sheets seriatim from said electrographic devices, including sheets having non-confidential information and sets of sheets having confidential information, wherein said confidential set comprises a first sheet having a confidential code, and a last sheet having a confidential code and no confidential data;
receiving said stream of copy sheets seriatim;
detecting said confidentiality code if present, as said sheets are received seriatim;
directing and advancing said sheets along a first sheet path comprising an exit tray, until said confidentiality code is detected;
directing and advancing sheets along a second sheet path comprising an assembly tray and a storage tray, once said confidential code on said first sheet of said confidential set is detected, until said confidential code on said last sheet of said confidential set is detected;
holding and accumulating said sheets delivered to said assembly tray;
delivering said confidential set in said assembly tray to said storage tray, after said last sheet of said confidential set is delivered; and
binding said set of confidential sheets on opposite sides as said set is delivered from said assembly tray to said storage tray.

11. The invention according to claim 10 further comprising the step of utilizing sheets having perforated edges.

12. The invention according to claim 10 wherein the delivering of said set of confidential sheets further comprises the step of starting and stopping the movement of said set being delivered from said assembly tray to said storage tray.

13. The invention according to claim 10 wherein the binding of said set of confidential sheets comprises the stapling together of opposite sides of said set of confidential sheets as said set is delivered from said assembly tray to said storage tray.

14. The invention according to claim 13 wherein the binding of said set of confidential sheets further comprises the step of stapling said set of confidential sheets during the step of stopped movement, as said set of confidential sheets is delivered from said assembly tray to said storage tray.

15. An apparatus for providing privacy for the message content in copy comprising:
an electrographic apparatus for producing a stream of copy sheets forming sets consisting of confidential message and sheets consisting of non-confidential messages, said set of confidential message comprising first and last copy sheets having a confidentiality code wherein said last copy sheet includes no confidential data, said sheets of non-confidential message comprising copy sheets which contain no confidentiality code;
a receiving tray for receiving said stream of copy sheets from said electrographic apparatus;
means for detecting the presence of said confidentiality code on said copy sheet;
an exit tray for stacking said copy sheets of non-confidential message;
means for directing and transporting said copy sheets of non-confidential message along a first path from said receiving tray to said exit tray for stacking;
an assembly tray for accumulating and assembling said set of confidential message;
means for directing and transporting copy sheets of said set of confidential message along a second path from said receiving tray to said assembly tray;
a storage tray for receiving said set of confidential message from said assembly tray;
means for delivering said set of confidential message from said assembly tray to said storage tray; and
a plurality of staplers having means for stapling said set of confidential message together along the sides of said set of confidential message as said set is delivered from said assembly tray to said storage tray.

16. An apparatus according to claim 15 further comprising a means for detecting the presence and position of said copy sheet in said receiving tray.

17. The apparatus according to claim 15 wherein said copy sheets further comprises copy sheets having perforated edges.

18. The apparatus according to claim 15 wherein said means for detecting said first and last sheet of said set of confidential message comprises a photo-optic sensor for detecting copy sheets having said confidentiality code thereon.

19. The apparatus according to claim 15 further comprising a deflector gate for directing copy sheets along said first path leading to said exit tray, and for directing sheets along said second path leading to said assembly tray.

20. The apparatus according to claim 15 wherein said means for delivering said set of confidential message from said assembly tray to said storage tray further comprises intermittently starting and stopping the delivery of said set of confidential message.

21. The apparatus according to claim 15 wherein said plurality of staplers for stapling said set together during the stop motion period of said intermittent delivery of said set of confidential message from said assembly tray to said storage tray.

22. The apparatus according to claim 15 further comprising control means for controlling the operation of said apparatus, being effective to determine when said first copy sheet of said set having confidential message is received, said control means further being effective to direct said copy sheets having non-confidential message along said first path, and directing cop sheets of said set of confidential message along said second path, and still further being effective to deliver and staple said set of confidential message from said assembly tay to said storage tray.

23. An apparatus for maintaining the confidentiality of said printed material by binding together a set of sheets to provide privacy for the information contained therein, comprising:
   means for receiving sheets delivered seriatim including a plurality of sheets having non-confidential information, or a plurality of sheets having confidential information;
   scanning means for detecting the presence of a code on said sheets having confidential information, or for detecting the presence of a code on said sheets having non-confidential information;
   assembling means for accumulating and assembling a set of sheets having confidential information or for assembling a set of sheets having non-confidential information;
   means for delivering said sheets having confidential information or said sheets having non-confidential information to said assembling means from said receiving means;
   storage means for receiving from said assembly means said set of sheets having non-confidential information, or said set of sheets having confidential information;
   means for delivering said sets of sheets from said assembly means to said storage means;
   means for binding said set of sheets having confidential information along opposite sides and along leading and trailing edges as said set of sheets having confidential information is delivered from said assembling means to said storage means; and
   means for binding said set of sheets having non-confidential information as said set of non-confidential sheets is delivered from said assembling means to said storage means.

24. The invention according to claim 23 wherein said sets of sheets having confidential information further comprises a last sheet of said set having a predetermined confidentiality code and no confidential data.

25. The invention according to claim 23 wherein said sets of sheets having non-confidential information further comprises a last sheet of said set having a separate predetermined non-confidentiality code.

26. The invention according to claim 23 wherein said means for detecting said sheets having coded indicia thereon further comprises a photo-optic sensor for detecting sheets having said confidentiality code thereon.

27. The invention according to claim 23 wherein said means for delivering said set of sheets having confidential information or said set of sheets having non-confidential information from said assembling means to said storage means further comprises intermittently starting and stopping the delivery of said sets of sheets.

28. The invention according to claim 23 wherein said means for binding comprises a stapler having means for stapling said sets of sheets together during the delivery of said sets of sheets from said assembly means to said storage means.

29. The invention according to claim 23 further comprising control means for controlling the operation of said apparatus, being effective to determine when said first sheet and said last sheet of said set of sheets having confidential information is received or said last sheet of said set of sheets having non-confidential information is received, control means further being effective to staple and deliver said set of sheets having confidential information and said set of sheets having non-confidential information from said assembling means to said storage means.

30. A method for providing confidentiality for information produced by electrographic devices comprising the steps of:
   producing a stream of copy sheets seriatim from said electrographic devices, including sheets having non-confidential information or sheets having confidential information, whereby said sheets having confidential information comprise a last sheet having a code mark and no confidential data, and said sheets having non-confidential information comprising a last sheet having a code mark;
   receiving said stream of copy sheets seriatim;
   detecting said code mark when present, as said sheets are received seriatim;
   delivering said sheets to an assembling tray for holding and collating into sets of sheets having confidential information or sets of sheets having non-confidential information;
   delivering said sets of sheets in said assembly tray to a storage tray, after said last sheet of said sets of sheets is delivered to said assembly tray;
   binding said set of sheets having confidential information on all four sides as said set of sheets having confidential information is delivered from said assembly tray to said storage tray; and
   binding said set of sheets having non-confidential information as said set of sheets having non-confidential information is delivered from said assembly tray to said storage tray.

31. The invention according to claim 30 wherein the delivering of said set of confidential sheets or said set of non-confidential sheets further comprises starting and stopping the movement of said sets being delivered from said assembly tray to said storage tray.

32. The invention according to claim 30 wherein the binding of said sets of sheets further comprises stapling said sets of sheets during the stopped movement, as said sets of sheets are delivered from said assembly tray to said storage tray.

* * * * *

UNITED STATES PATENT AND TRADEMARK OFFICE
CERTIFICATE OF CORRECTION

PATENT NO. : 5,180,153

DATED : January 19, 1993

INVENTOR(S) : Gegenheimer et al

It is certified that error appears in the above-identified patent and that said Letters Patent is hereby corrected as shown below:

In claim 22:

Column 21, line 26, change "cop" to -- copy --.

line 29, change "tay" to --tray --.

Signed and Sealed this

Sixteenth Day of November, 1993

Attest:

BRUCE LEHMAN

*Attesting Officer*     *Commissioner of Patents and Trademarks*